(12) United States Patent
Zheng et al.

(10) Patent No.: US 8,644,576 B2
(45) Date of Patent: Feb. 4, 2014

(54) METHOD AND SYSTEM FOR MULTI-PART LEFT ATRIUM SEGMENTATION IN C-ARM COMPUTED TOMOGRAPHY VOLUMES USING SHAPE CONSTRAINTS

(75) Inventors: Yefeng Zheng, Dayton, NJ (US); Tianzhou Wang, Princeton, NJ (US); Matthias John, Nürnberg (DE); Gareth Funka-Lea, Cranbury, NJ (US); Jan Boese, Eckental (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 76 days.

(21) Appl. No.: 13/415,890

(22) Filed: Mar. 9, 2012

(65) Prior Publication Data

US 2012/0230570 A1    Sep. 13, 2012

Related U.S. Application Data

(60) Provisional application No. 61/451,028, filed on Mar. 9, 2011.

(51) Int. Cl.
*G06K 9/00*        (2006.01)
*A61B 6/00*        (2006.01)
*A61B 5/05*        (2006.01)

(52) U.S. Cl.
USPC ................ 382/131; 378/4; 378/21; 600/425

(58) Field of Classification Search
USPC ......... 382/128, 129, 130, 131, 132, 133, 134, 382/164, 171, 173; 378/4, 8, 21–27, 901; 600/16, 426, 485, 504, 508, 509, 514, 600/425; 128/920, 922
See application file for complete search history.

(56) References Cited

U.S. PATENT DOCUMENTS

| 7,565,190 B2 * | 7/2009 | Okerlund et al. ............. 600/426 |
| 7,957,572 B2 * | 6/2011 | Von Berg et al. ............. 382/128 |
| 2010/0316278 A1 * | 12/2010 | Hartung et al. ............... 382/131 |
| 2011/0096964 A1 | 4/2011 | Zheng et al. |
| 2012/0026169 A1 | 2/2012 | Bernhardt et al. |

* cited by examiner

*Primary Examiner* — Abolfazl Tabatabai

(57) ABSTRACT

A method and system for multi-part left atrium (LA) segmentation in a C-arm CT volume is disclosed. Multiple LA part models, including an LA chamber body mesh, an appendage mesh, a left inferior pulmonary vein (PV) mesh, a left superior PV mesh, a right inferior PV mesh, and a right superior PV mesh, are segmented in a 3D volume. The LA chamber body mesh and the appendage mesh may be segmented as a combined object and the PV meshes may be segmented subject to a statistical shape constraint. A consolidated LA mesh is generated from the segmented LA part models.

21 Claims, 6 Drawing Sheets

(a)  (b)  (c)  (d)

METHOD AND SYSTEM FOR MULTI-PART LEFT ATRIUM SEGMENTATION IN C-ARM COMPUTED TOMOGRAPHY VOLUMES USING SHAPE CONSTRAINTS

This application claims the benefit of U.S. Provisional Application No. 61/451,028, filed Mar. 9, 2011, the disclosure of which is herein incorporated by reference.

BACKGROUND OF THE INVENTION

The present invention relates to cardiac imaging, and more particularly, to left atrium segmentation in C-arm computed tomography (CT) images.

Strokes are the third leading cause of death in the United States. Approximately fifteen percent of all strokes are caused by atrial fibrillation (AF). As a widely used minimally invasive surgery to treat AF, a catheter based ablation procedure uses high radio-frequency energy to eliminate sources of ectopic foci, especially around the ostia of the appendage and the pulmonary veins (PV). Automatic segmentation of the left atrium (LA) is important for pre-operative assessment to identify the potential sources of electric events. However, there are large variations in PV drainage patterns between different patients. For example, the most common variations, which are found in 20-30% of the population, are extra right PVs and left common PVs (where two left PVs merge into one before joining the chamber).

Conventional LA segmentation methods can be roughly categorized as non-model based or model-based approaches. The non-model based approaches do not assume any prior knowledge of the LA shape and the whole segmentation procedure is purely data driven. An advantage of non-model based methods is that they can handle structural variations of the PVs. However, such methods cannot provide the underlying anatomical information (e.g., which part of the segmentation is the left inferior PV). In practice non-model based approaches work well on computed tomography (CT) or magnetic resonance imaging (MRI) data, but such methods are typically not robust on challenging C-arm CT images. Model based approaches exploit a prior shape of the LA (either in the form of an atlas or a mean shape mesh) to guide the segmentation. Using a prior shape constraint typically allows model based approaches to avoid leakage around weak or missing boundaries, which plagues non-model based approaches. However, using one mean shape, it is difficult to handle structural variations (e.g., the left common PV). In order to address PV variations, multiple atlases are required, which costs extra computation time.

BRIEF SUMMARY OF THE INVENTION

The present invention provides a method and system for automatically segmenting the left atrium (LA) in C-arm CT image data. Embodiments of the present invention utilize a part based LA model including the chamber, appendage, and four major pulmonary veins (PVs). Embodiments of the present invention use a model based approach to segment the LA parts and enforce a statistical shape constraint during estimation of pose parameters of the different parts.

In one embodiment of the present invention, an LA chamber body mesh, an appendage mesh, and a plurality of PV meshes are segmented in a 3D volume. The PV meshes may include a left inferior PV mesh, a left superior PV mesh, a right inferior PV mesh, and a right superior PV mesh. The LA chamber body mesh and the appendage mesh may be segmented as a combined object and the PV meshes may be segmented subject to a statistical shape constraint. A consolidated LA mesh is generated from the segmented LA chamber body mesh, appendage mesh, and PV meshes.

These and other advantages of the invention will be apparent to those of ordinary skill in the art by reference to the following detailed description and the accompanying drawings.

DETAILED DESCRIPTION

The present invention is directed to a method and system for fully automatic segmentation of the left atrium (LA) in C-arm CT image data. Embodiments of the present invention are described herein to give a visual understanding of the LA segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Embodiments of the present invention provide fully automatic LA segmentation in C-arm CT data. Compared to conventional CT or MRI, an advantage of C-arm CT is that overlay of the 3D patient-specific LA model onto a 2D fluoroscopic image is straightforward and accurate since both the 3D and 2D images are captured on the same device within a short time interval. Typically, a non-electrocardiography-gated acquisition is performed to reconstruct a C-arm CT volume. Accordingly, the C-arm CT volume often contains severe motion artifacts. For a C-arm image acquisition device with a small X-ray detector panel, part of a patient's body may be missing in some 2D X-ray projections due to the limited field of view, resulting in significant artifacts around the margin of a reconstructed volume. In addition, there may be severe streak artifacts caused by various catheters inserted in the heart. These challenges are addressed herein using a model based approach for LA segmentation, which also takes advantage a machine learning based object pose detector and boundary detector.

Instead of using one mean model, the challenge of pulmonary vein (PV) structural variations is addressed in embodiments of the present invention using a part based model, where the whole LA is split into the chamber, appendage, and four major PVs. Each part is a much simpler anatomical structure compared to the holistic LA structure. Therefore, each part can be detected and segmented using a model based approach. In order to increase robustness, embodiments of the present invention detect the most reliable structure (the LA chamber) and use it to constrain the detection of other parts (the appendage and PVs). In particular, the robustness of detecting the appendage can be increased by segmenting the LA chamber model and the appendage model as a single object. Due to large variations, the relative position of the PVs to the LA chamber varies significantly. In an advantageous embodiment, a statistical shape model is used to enforce a shape constraint during the estimation of PV pose parameters (position, orientation, and size).

Figure 1:
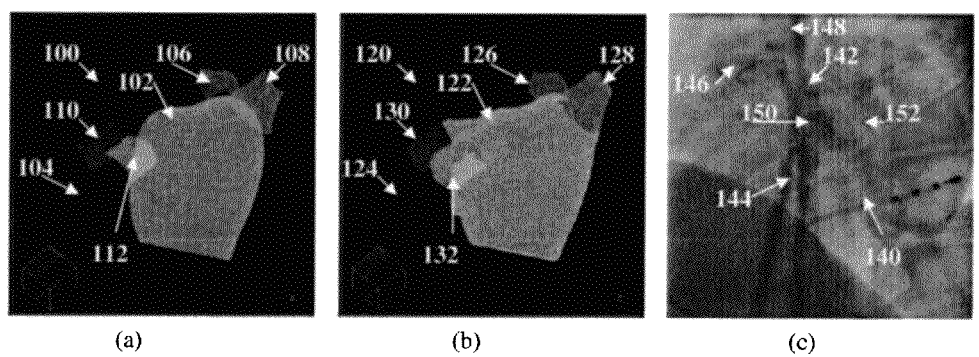
FIG. 1 illustrates a part-based left atrium model according to an embodiment of the present invention.

FIG. 1 illustrates a part-based LA model according to an embodiment of the present invention. As shown in image (a) of FIG. 1, the part-based LA model 100 includes the LA chamber body 102, appendage 104, and four major PVs 106, 108, 110, and 112. The four major PVs are the left inferior PV 112, the left superior PV 110, the right inferior PV 108, and the right superior PV 106. The shape of the appendage 104 is close to a tilted cone and the PVs 106, 108, 110, and 112 each have a tubular structure. Since, for atrial fibrillation (AF) ablation, physicians typically only care about a proximal PV trunk, the each PV model 106, 108, 110, and 112 only detects a trunk of 20 mm in length originating from its respective ostium. Each LA part 102, 104, 106, 108, 110, and 112 is a much simpler anatomical structure as compared to a holistic LA structure, and therefore can be detected and segmented using a model based approach. Once the LA parts are segmented in a C-arm CT volume, they are combined into a consolidated mesh model. Image (b) of FIG. 1 shows a consolidated LA mesh 120 including the LA chamber 122, appendage 124, and PVs 126, 128, 130, and 132. Image (c) of FIG. 1 shows the overlay of a consolidated LA mesh 140 including the LA chamber 142, appendage 144, and PVs 146, 148, 150, and 152 on a 2D fluoroscopic image.

Figure 2:
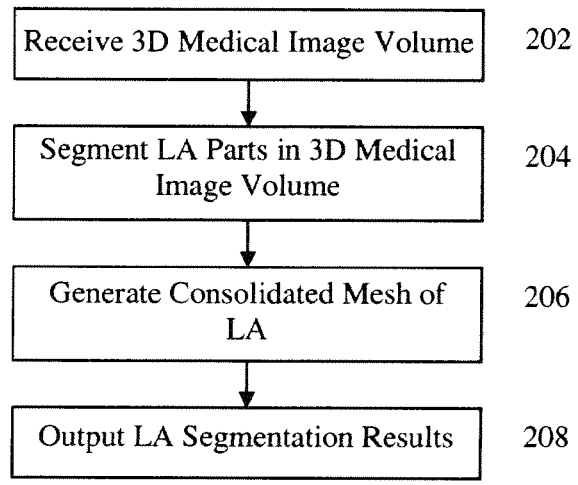
FIG. 2 illustrates a method for part-based segmentation of the left atrium according to an embodiment of the present invention.

FIG. 2 illustrates a method for part-based segmentation of the LA according to an embodiment of the present invention. As illustrated in FIG. 2, at step 202, a 3D medical image volume is received. In an advantageous embodiment, the 3D medical image volume is a C-arm CT volume, but the present invention is not limited thereto and may be similarly applied to other types of 3D volumes, such as conventional CT and MRI volumes, as well. The 3D medical image volume may be received directly from an image acquisition device, such as a C-arm image acquisition device. It is also possible that the 3D medical image volume is received by loading a 3D medical image volume stored on a storage or memory of a computer system.

At step 204, the LA parts are segmented in the 3D medical image volume. In particular, the LA chamber body, appendage, left inferior PV, left superior PV, right inferior PV, and right superior PV are segmented in the 3D medical image volume, resulting in a patient-specific mesh for each of the parts. Marginal Space Learning (MSL) can be used to segment each of the LA chamber mesh, the appendage mesh, and the PV meshes in the 3D volume.

MSL is used to estimate the position, orientation, and scale of an object in a 3D volume using a series of detectors trained using annotated training data. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. A 3D object detection (object pose estimation) is split into three steps: object position estimation, position-orientation estimation, and position-orientation-scale estimation. A separate classifier is trained based on annotated training data for each of these steps. This object localization stage results in an estimated transformation (position, orientation, and scale) of the object, and a mean shape of the object is aligned with the 3D volume using the estimated transformation. After the object pose estimation, the boundary of the object is refined using a learning based boundary detector. MSL is described in greater detail in U.S. Pat. No. 7,916,919, issued Mar. 29, 2011, and entitled "System and Method for Segmenting Chambers of a Heart in a Three Dimensional Image", which is incorporated herein by reference.

For each LA part (chamber body, appendage, and each PV), an MSL based pose detector (including position, position-orientation, and position-orientation-scale detectors) and a learning based boundary detector are trained based on annotated training data. The trained detectors for each LA part can be used to segment a separate mesh for each LA part in the 3D volume. Compared to a holistic approach for LA segmentation, the part based approach can handle large structural variations. The MSL based segmentation works well for the LA chamber. However, independent detection of the other parts may not be robust, either due to low contrast (appendage) or small object size (PVs). Accordingly, an advantageous embodiment of the present invention, described in FIG. 3 below, uses constrained detection of the LA parts. In particular, the detection of the appendage and the PVs may be constrained by the LA chamber body.

Figure 3:
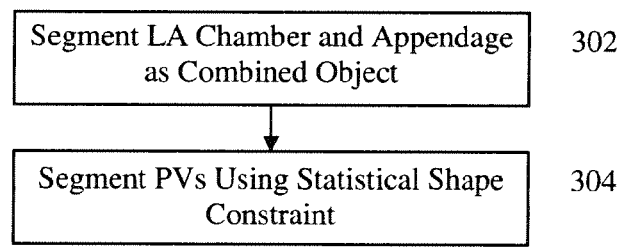
FIG. 3 illustrates a method of segmenting the left atrium parts in a 3D volume according to an embodiment of the present invention.

FIG. 3 illustrates a method of segmenting the LA parts in a 3D volume according to an embodiment of the present invention. FIG. 3 can advantageously be used to implement step 204 of FIG. 2. At step 302, the LA chamber body and the appendage are segmented as a combined object. In C-arm CT, the appendage is particularly difficult to detect. The appendage is a pouch without an outlet and the blood flow inside the appendage is slow, which may prevent the appendage frame filling with contrast agent. In many datasets, the appendage is only barely visible. The trained MSL detector for the appendage may detect the neighboring left superior PV, which often touches the appendage and has a higher contrast. However, the relative position of the appendage to the chamber is quite consistent. Accordingly, a more robust detection is achieved by segmenting the appendage mesh and the chamber mesh as a single object. In this case, one MSL based posed detector is trained to detect the combined object.

At step 304, the PVs are segmented using a statistical shape constraint. Through comparison experiments, the present inventors have determined that neither a holistic approach, nor independent detection was robust in detecting the four PVs. An advantageous embodiment of the present invention enforces a shape constraint in detection of the PVs. A point distribution model (PDM) is often used to enforce a statistical shape constraint among a set of landmarks. The total variation of the shape is decomposed into orthogonal deformation modes through principal component analysis (PCA). A deformed shape is projected into a low dimensional deformation subspace to enforce a statistical shape constraint.

Figure 4:
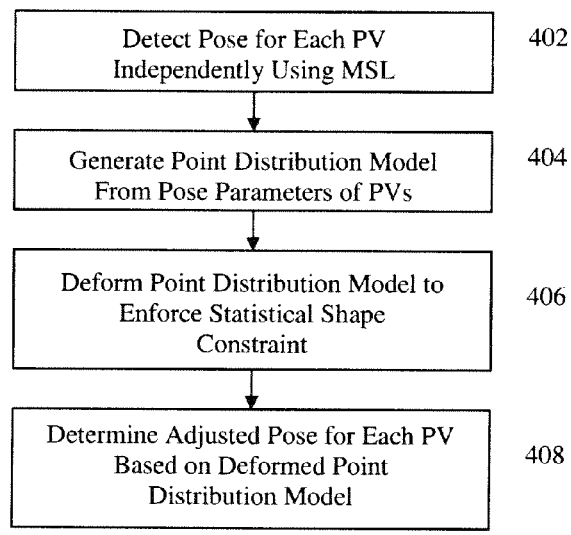
FIG. 4 illustrates a method for segmenting the pulmonary veins using a statistical shape constrained according to an embodiment of the present invention.

FIG. 4 illustrates a method for segmenting the PVs using a statistical shape constraint according to an embodiment of the present invention. The method of FIG. 4 can be used to implement step 304 of FIG. 3. At step 402, a pose for each PV is independently detected using MSL. In particular, for each PV (left inferior, left superior, right inferior, and right interior), a respective trained MSL detector estimates nine pose parameters: three position parameters ($T_x, T_y, T_z$), three orientation Euler angles ($O_x, O_y, O_z$), and three anisotropic scaling parameters ($S_x, S_y, S_z$).

At step 404, a point distribution model is generated from the estimated pose parameters of the PV. Different from the conventional PDM, which enforces a shape constraint on a set of landmark points, in this case the shape constraint must be enforced on the estimated orientation and size of each PV. One possible solution is to stack all of the PV pose parameters into a large vector to perform PCA. However, the position and orientation parameters are measured in different units. If not weighted properly, the extracted deformation modes may be dominated by one category of transformation. Furthermore, the Euler angles are periodic (with a period of $2\pi$), which prevents application of PCA.

An advantageous embodiment of the present invention utilizes a new representation of the pose parameters in order to avoid the above described problems. The object pose can be fully represented by the object center T together with three scaled orthogonal axes. Alternative to the Euler angles, the object orientation can be represented as a rotation matrix ($R_x, R_y, R_z$) and each column of R defines an axis. The object pose parameters can be fully represented by a four-point set $T, V_x, V_y, V_z$, where:

$$V_x = T + S_x R_x, V_y = T + S_y R_y, V_z = T + S_z R_z. \quad (1)$$

Using the above representation, the pose of each PV is represented as a set of four points. The four points essentially represent a center point and three corner points of a bounding box defined by the pose parameters. In order to generate the PDM, the pose parameters estimated at step 402 for each of the four PVs are converted to the four-point representation. In addition to the four points for each of the PVs, the center points of the detected LA chamber and appendage are also added to the PDM in order to stabilize the detection. This results in a PDM having 18 points.

At step 406, the point distribution model is deformed to enforce a statistical shape constraint. An active shape model (ASM) is used to adjust the points representing the PV poses in order to enforce the statistical shape model. The statistical shape constraint is learned from PDMs constructed from the annotated LA parts (LA chamber, appendage, and PVs) in training volumes. The total variation of the shape is decomposed into orthogonal deformation modes through PCA. After the patient-specific PDM representing the poses of the PVs is generated, the patient-specific PDM is projected into a subspace with eight dimensions (which covers about 75% of the total variation) to enforce the statistical shape constraint.

At step 408, an adjusted pose is recovered for each of the PVs based on the deformed point distribution model. After enforcing the statistical shape constraint, the deformed four-point representation for a PV can be expressed as: ($\hat{T}, \hat{V}_x, \hat{V}_y, \hat{V}_z$). The adjusted PV center is given by point $\hat{T}$. The adjusted orientation $\hat{R}$ and scale $\hat{S}$ can be recovered by simple inversion of Equation (1). However, the estimate $\hat{R}$ is generally not a true rotation matrix $\hat{R}^T \hat{R} = I$. Accordingly, the adjusted rotation is determined by calculating the nearest rotation matrix $R_O$ to minimize the sum squares in elements in the difference matrix $R_O - \hat{R}$, which is equivalent to:

$$R_O = \min_R \text{Trace}((R - \hat{R})^T (R - \hat{R})), \quad (2)$$

subject to $R_O^T R_O = I$. Here, Trace(.) is the sum of the diagonal elements. The optimal solution to Equation (2) is given by:

$$R_O = \hat{R}(\hat{R}^T \hat{R})^{-1/2}. \quad (3)$$

This results in an adjusted pose for each of the four PVs. The adjusted pose for each PV can then be used to align the mean shape of each respective PV, and then the learning based boundary detector can be applied to each PV, as described above. Furthermore, in a possible implementation, the method of FIG. 4 can be applied iteratively to estimate the poses for the PV, where the adjusted poses for the PVs determined in step 408 in one iteration can be used to constrain a search region for the MSL-based detection of the PVs at step 402 in the next iteration. In this case, the method steps of FIG. 4 can be repeated until the PV poses converge or for a predetermined number of iterations.

Figure 5:
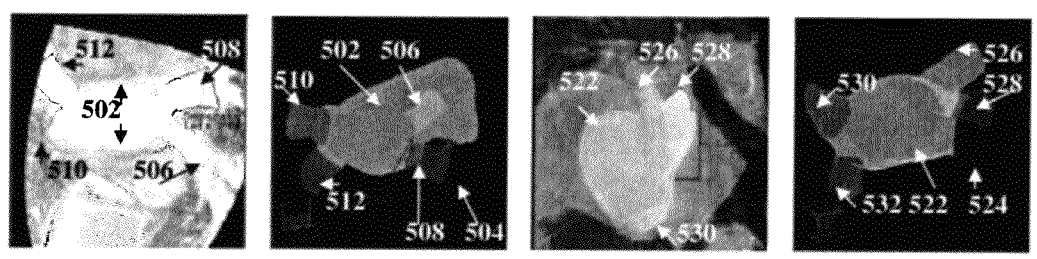
FIG. 5 illustrates exemplary left atrium chamber, appendage, and pulmonary vein segmentation results.

FIG. 5 illustrates exemplary LA chamber, appendage, and PV segmentation results. Images (a) and (b) of FIG. 5 show segmentation results for a patient with separate left inferior and superior PVs and images (c) and (d) show segmentation results for a patient with a left common PV. As shown in images (a) and (b), an LA chamber mesh 502, appendage mesh 504, left inferior PV mesh 506, left superior PV mesh 508, right inferior PV mesh 510, and right superior PV mesh 512 are successfully segmented for a patient with separate left inferior and superior PVs. As shown in images (c) and (d), an LA chamber mesh 522, appendage mesh 524, left inferior PV mesh 526, left superior PV mesh 528, right inferior PV mesh 530, and right superior PV mesh 532 are successfully segmented for a patient with a left common PV where the left inferior and superior PVs merge into one before joining the chamber.

Returning to FIG. 2, at step 206, a consolidated mesh of the LA is generated from the segmented meshes of the LA parts. The constrained detection and segmentation described above results in six meshes (the LA chamber mesh, appendage mesh, left inferior PV mesh, left superior PV mesh, right inferior PV mesh, and right superior PV mesh), as shown in image (a) of FIG. 1. There may be gaps and/or intersections among the different meshes. For use in AF ablation procedures, physicians likely prefer a consolidated mesh with different anatomical structures labeled with different structures.

Figure 6:
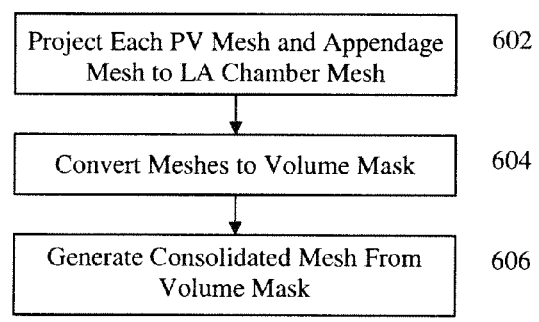
FIG. 6 illustrates a method for generating a consolidated mesh from the left atrium part meshes according to an embodiment of the present invention.
Figure 7:
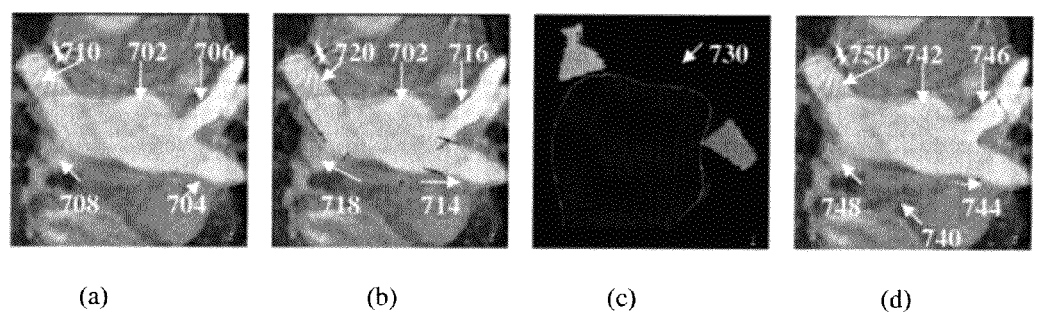
FIG. 7 illustrates exemplary results of the method steps of FIG. 6.

FIG. 6 illustrates a method for generating a consolidated mesh from the LA part meshes according to an embodiment of the present invention. The method of FIG. 6 can be used to implement step 206 of FIG. 2. As illustrated in FIG. 6, at step 602, each PV mesh and the appendage mesh are projected to the LA chamber mesh. In particular, the proximal rim of each PV mesh and the appendage mesh is projected onto the LA chamber mesh along the centerline of the respective mesh in order to eliminate gaps between each PV mesh and the LA chamber mesh and gaps between the appendage mesh and the LA chamber mesh. This results in the meshes being fully connected. FIG. 7 illustrates exemplary results of the method steps of FIG. 6. Image (a) of FIG. 7 illustrates separate meshes segmented for the LA chamber 702 and PVs 704, 706, 708, and 710. Image (b) of FIG. 7 shows PV meshes 714, 716, 718, and 720 having added mesh pieces resulting from being projected to connect with the LA chamber mesh 702.

Returning to FIG. 6, at step 604, the connected meshes are converted to a volume mask. After step 602, the meshes are fully connected. However, mesh intersections may still be present; pieces of one or more of the PV meshes may lie inside the segmented LA chamber. Instead of working directly on the meshes to resolve such intersections, the meshes are converted to a volume mask. The volume mask is a binary mask in which all voxels inside the 3D meshes are considered "positive" and all voxels outside of are considered "negative". The volume mask can be generated by assigning all positive voxels a predetermined intensity and all negative voxels an intensity of zero. Referring to FIG. 7, image (c) shows a volume mask 730 generated from the meshes in image (b).

Returning to FIG. 6, at step 606, a consolidated mesh is generated from the volume mask. In particular, a new mesh is generated from the volume mask using the well-known marching cubes algorithm. The conversion of the connected meshes to a volume mask (step 604) and generation of a new mesh from the volume mask (step 606) removes an intersections in which a PV mesh protrudes in the LA chamber mesh and results in a consolidated patient-specific mesh showing the LA chamber, appendage, left inferior PV, left superior PV, right inferior PV, and right superior PV. Referring to FIG. 7, image (d) shows a consolidated mesh 740. The consolidated mesh 740 provides a patient-specific segmentation of the LA chamber 742, appendage (not shown), left inferior PV 744, left superior PV 746, right inferior PV 748, and right superior PV 750.

Returning to FIG. 2, at step 208, the LA segmentation results are output. For example, the consolidated mesh may be output by displaying the consolidated mesh on a display device of a computer system or by overlaying the consolidated mesh onto a 2D fluoroscopic image for guidance of a catheter ablation procedure (as shown in image (c) of FIG. 1). The segmentation results may also be output be storing the segmentation results on a storage or memory of a computer system.

Figure 8:
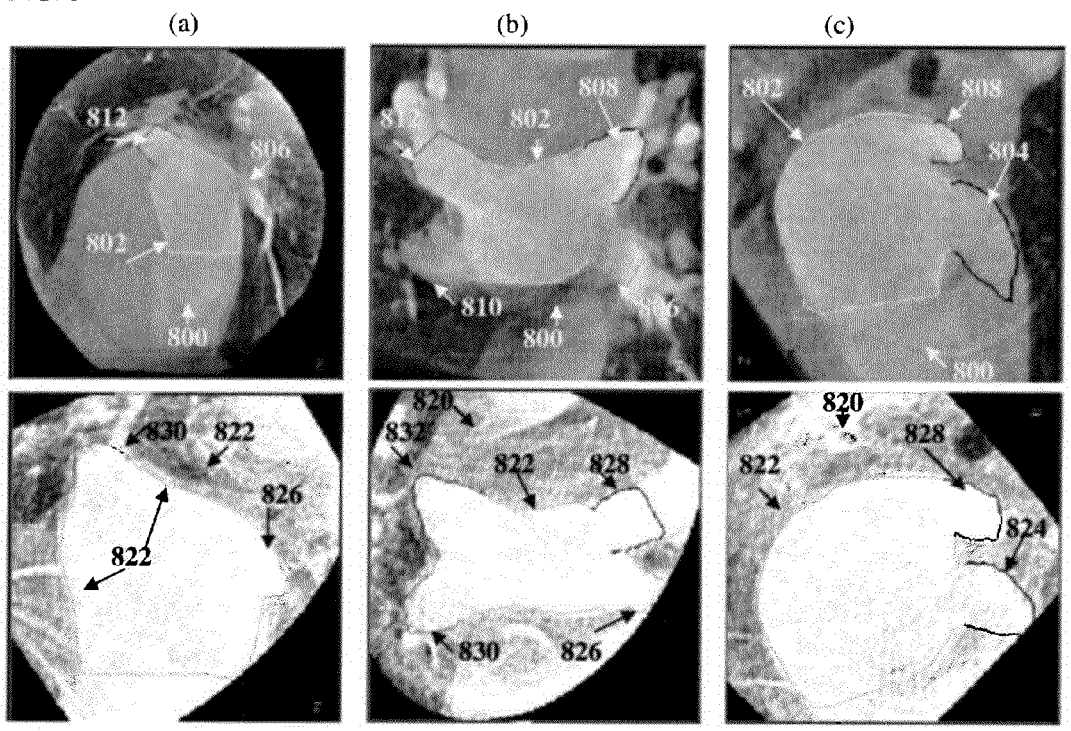
FIG. 8 illustrates exemplary left atrium segmentation results.

FIG. 8 illustrates exemplary LA segmentation results using the above described methods. Images (a), (b), and (c) of FIG. 8 show exemplary LA segmentation results in three different views of a large C-arm CT volume. A shown in images (a), (b), and (c), a consolidated LA mesh 800 is segmented in the volume, providing patient-specific segmentation of the LA chamber 802, appendage 804, left inferior PV 806, left superior PV 808, right inferior PV 810, and right superior PV 812. Images (d), (e), and (f) of FIG. 8 show exemplary LA segmentation results in three different views of a small C-arm CT volume. As shown in images (d), (e), and (f), a consolidated LA mesh 820 is segmented in the volume, providing patient-specific segmentation of the LA chamber 822, appendage 824, left inferior PV 826, left superior PV 828, right inferior PV 830, and right superior PV 832.

Figure 9:
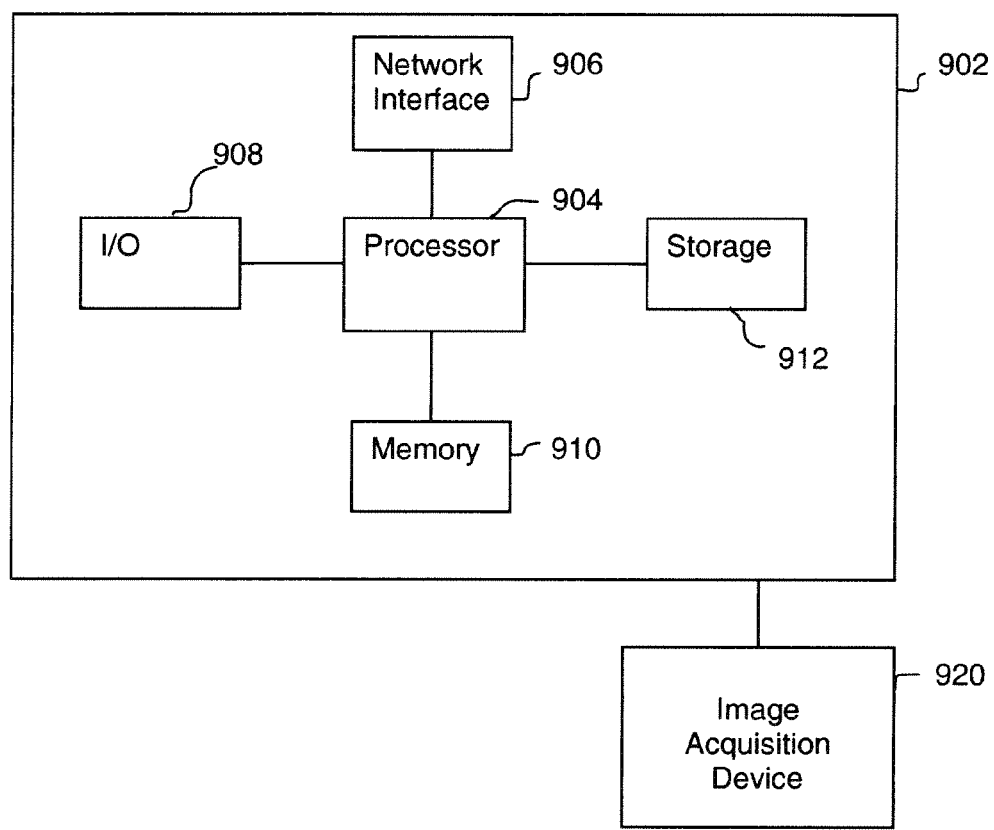
FIG. 9 is a high level block diagram of a computer capable of implementing the present invention.

The above-described methods for multi-part left atrium segmentation may be implemented on a computer using well-known computer processors, memory units, storage devices, computer software, and other components. A high level block diagram of such a computer is illustrated in FIG. 9. Computer 902 contains a processor 904 which controls the overall operation of the computer 902 by executing computer program instructions which define such operation. The computer program instructions may be stored in a storage device 912, or other computer readable medium (e.g., magnetic disk, CD ROM, etc.) and loaded into memory 910 when execution of the computer program instructions is desired. Thus, the steps of the methods of FIGS. 2, 3, 4, and 6 may be defined by the computer program instructions stored in the memory 910 and/or storage 912 and controlled by the processor 904 executing the computer program instructions. An image acquisition device 920, such as a C-arm image acquisition device, can be connected to the computer 902 to input images to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.). One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of segmenting a left atrium (LA) in a 3D volume comprising:
    segmenting an LA chamber body mesh, an appendage mesh, and a plurality of pulmonary vein (PV) meshes in the 3D volume, wherein the LA chamber body mesh and the appendage mesh are segmented as a combined object and the plurality of PV meshes are segmented subject to a statistical shape constraint, and the segmenting of the plurality of PV meshes subject to the statistical shape constraint comprises:
        independently estimating pose parameters for each of the plurality of PV meshes in the 3D volume using marginal space learning (MSL),
        generating a point distribution model based on the pose parameters and center points of the segmented LA chamber body and appendage meshes, and
        adjusting the pose parameters for the plurality of PV meshes by enforcing a statistical shape constraint on the generated point distribution model; and
    generating a consolidated LA mesh from the LA chamber body mesh, the appendage mesh and the plurality of PV meshes.

2. The method of claim 1, wherein the plurality of PV meshes includes a left inferior PV mesh, a left superior PV mesh, a right inferior PV mesh, and a right superior PV mesh.

3. The method of claim 1, wherein the segmenting of the LA chamber body mesh and the appendage mesh as a combined object comprises:
    segmenting the combined object including the LA chamber body mesh and the appendage mesh using marginal space learning (MSL).

4. The method of claim 1, wherein the step of generating a point distribution model based on the pose parameters and center points of the segmented LA chamber body and appendage meshes comprises:
    for each of the plurality of PV meshes, converting the pose parameters estimated for the PV mesh to a set of four-point set representing the estimated pose parameters, wherein the four-point set includes a center point and three corner points of a bounding box defined by the estimated pose parameters for the PV mesh; and generating the point distribution model including each of the four-point sets representing the estimated pose parameters of the plurality of PV meshes, the center point of the segmented chamber body mesh, and the center point of the segmented appendage mesh.

5. The method of claim 4, wherein the step of adjusting the pose parameters for the plurality of PV meshes by enforcing a statistical shape constraint on the generated point distribution model comprises:

deforming the point distribution model using an active shape model to enforce the statistical shape constraint;

determining an adjusted pose for each of the plurality of PV meshes based on the deformed point distribution model.

6. The method of claim 1, wherein the step of generating a consolidated LA mesh from the LA chamber body mesh, the appendage mesh and the plurality of PV meshes comprises:

connecting the LA chamber mesh with the appendage mesh and each of the plurality of PV meshes by projecting the appendage mesh and each of the plurality of PV meshes to the LA chamber mesh, resulting in a connected set of meshes;

converting the connected set of meshes to a volume mask; and generating the consolidated LA mesh from the volume mask.

7. The method of claim 6, wherein the step of generating the consolidated LA mesh from the volume mask comprises:

generating the consolidated LA mesh from the volume mask using a marching cubes algorithm.

8. The method of claim 1, wherein the 3D volume is a 3D C-arm CT volume.

9. An apparatus for segmenting a left atrium (LA) in a 3D volume comprising:

means for segmenting an LA chamber body mesh, an appendage mesh, and a plurality of pulmonary vein (PV) meshes in the 3D volume, wherein the means for segmenting an LA chamber body mesh, an appendage mesh, and a plurality of pulmonary vein (PV) meshes in the 3D volume comprises means for segmenting the LA chamber body mesh and the appendage mesh as a combined object and means for segmenting the plurality of PV meshes subject to a statistical shape constraint, and the means for segmenting the plurality of PV meshes subject to the statistical shape constraint comprises:

means for independently estimating pose parameters for each of the plurality of PV meshes in the 3D volume using marginal space learning (MSL), means for generating a point distribution model based on the pose parameters and center points of the segmented LA chamber body and appendage meshes, and means for adjusting the pose parameters for the plurality of PV meshes by enforcing a statistical shape constraint on the generated point distribution model; and means for generating a consolidated LA mesh from the LA chamber body mesh, the appendage mesh and the plurality of PV meshes.

10. The apparatus of claim 9, wherein the plurality of PV meshes includes a left inferior PV mesh, a left superior PV mesh, a right inferior PV mesh, and a right superior PV mesh.

11. The apparatus of claim 9, wherein the means for segmenting the LA chamber body mesh and the appendage mesh as a combined object comprises:

means for segmenting the combined object including the LA chamber body mesh and the appendage mesh using marginal space learning (MSL).

12. The apparatus of claim 9, wherein the means for generating a point distribution model based on the pose parameters and center points of the segmented LA chamber body and appendage meshes comprises:

means for converting the pose parameters estimated for a PV mesh to a set of four-point set representing the estimated pose parameters, wherein the four-point set includes a center point and three corner points of a bounding box defined by the estimated pose parameters for the PV mesh; and means for generating the point distribution model including the four-point sets representing the estimated pose parameters of each of the plurality of PV meshes, the center point of the segmented chamber body mesh, and the center point of the segmented appendage mesh.

13. The apparatus of claim 12, wherein the means for adjusting the pose parameters for the plurality of PV meshes by enforcing a statistical shape constraint on the generated point distribution model comprises:

means for deforming the point distribution model using an active shape model to enforce the statistical shape constraint;

means for determining an adjusted pose for each of the plurality of PV meshes based on the deformed point distribution model.

14. The apparatus of claim 9, wherein the means for generating a consolidated LA mesh from the LA chamber body mesh, the appendage mesh and the plurality of PV meshes comprises:

means for connecting the LA chamber mesh with the appendage mesh and each of the plurality of PV meshes to result in a connected set of meshes;

means for converting the connected set of meshes to a volume mask; and means for generating the consolidated LA mesh from the volume mask.

15. A non-transitory computer readable medium encoded with computer executable instructions for segmenting a left atrium (LA) in a 3D volume, the computer executable instructions defining a method comprising:

segmenting an LA chamber body mesh, an appendage mesh, and a plurality of pulmonary vein (PV) meshes in the 3D volume, wherein the LA chamber body mesh and the appendage mesh are segmented as a combined object and the plurality of PV meshes are segmented subject to a statistical shape constraint, and the segmenting of the plurality of PV meshes subject to the statistical shape constraint comprises:

independently estimating pose parameters for each of the plurality of PV meshes in the 3D volume using marginal space learning (MSL), generating a point distribution model based on the pose parameters and center points of the segmented LA chamber body and appendage meshes, and adjusting the pose parameters for the plurality of PV meshes by enforcing a statistical shape constraint on the generated point distribution model; and generating a consolidated LA mesh from the LA chamber body mesh, the appendage mesh and the plurality of PV meshes.

16. The non-transitory computer readable medium of claim 15, wherein the plurality of PV meshes includes a left inferior PV mesh, a left superior PV mesh, a right inferior PV mesh, and a right superior PV mesh.

17. The non-transitory computer readable medium of claim 15, wherein the segmenting of the LA chamber body mesh and the appendage mesh as a combined object comprises:
- segmenting the combined object including the LA chamber body mesh and the appendage mesh using marginal space learning (MSL).

18. The non-transitory computer readable medium of claim 15, wherein the step of generating a point distribution model based on the pose parameters and center points of the segmented LA chamber body and appendage meshes comprises:
- for each of the plurality of PV meshes, converting the pose parameters estimated for the PV mesh to a set of four-point set representing the estimated pose parameters, wherein the four-point set includes a center point and three corner points of a bounding box defined by the estimated pose parameters for the PV mesh; and
- generating the point distribution model including each of the four-point sets representing the estimated pose parameters of the plurality of PV meshes, the center point of the segmented chamber body mesh, and the center point of the segmented appendage mesh.

19. The non-transitory computer readable medium of claim 18, wherein the step of adjusting the pose parameters for the plurality of PV meshes by enforcing a statistical shape constraint on the generated point distribution model comprises:
- deforming the point distribution model using an active shape model to enforce the statistical shape constraint;
- determining an adjusted pose for each of the plurality of PV meshes based on the deformed point distribution model.

20. The non-transitory computer readable medium of claim 15, wherein the step of generating a consolidated LA mesh from the LA chamber body mesh, the appendage mesh and the plurality of PV meshes comprises:
- connecting the LA chamber mesh with the appendage mesh and each of the plurality of PV meshes by projecting the appendage mesh and each of the plurality of PV meshes to the LA chamber mesh, resulting in a connected set of meshes;
- converting the connected set of meshes to a volume mask; and
- generating the consolidated LA mesh from the volume mask.

21. The non-transitory computer readable medium of claim 20, wherein the step of generating the consolidated LA mesh from the volume mask comprises:
- generating the consolidated LA mesh from the volume mask using a marching cubes algorithm.

* * * * *